(12) United States Patent
Uno

(10) Patent No.: US 9,409,572 B2
(45) Date of Patent: Aug. 9, 2016

(54) DRIVE ASSIST SYSTEM, DRIVE ASSIST METHOD, AND DRIVE ASSIST DEVICE

(71) Applicant: Satoshi Uno, Tokyo (JP)

(72) Inventor: Satoshi Uno, Tokyo (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/763,636

(22) PCT Filed: Jan. 22, 2014

(86) PCT No.: PCT/IB2014/000058
§ 371 (c)(1),
(2) Date: Jul. 27, 2015

(87) PCT Pub. No.: WO2014/115016
PCT Pub. Date: Jul. 31, 2014

(65) Prior Publication Data
US 2015/0360685 A1 Dec. 17, 2015

(30) Foreign Application Priority Data
Jan. 28, 2013 (JP) ................... 2013-013519

(51) Int. Cl.
B60W 30/18 (2012.01)
B60W 30/00 (2006.01)
B60W 50/04 (2006.01)
G07C 5/00 (2006.01)
B60T 7/12 (2006.01)
B60W 30/02 (2012.01)

(52) U.S. Cl.
CPC *B60W 30/00* (2013.01); *B60T 7/12* (2013.01); *B60W 50/045* (2013.01); *G07C 5/008* (2013.01); *B60W 30/02* (2013.01); *B60W 30/18109* (2013.01); *B60W 30/18172* (2013.01); *B60W 2050/046* (2013.01); *B60W 2550/402* (2013.01); *B60W 2750/40* (2013.01)

(58) Field of Classification Search
None
See application file for complete search history.

(56) References Cited

FOREIGN PATENT DOCUMENTS

| JP | 2006-195579 A | 7/2006 |
|---|---|---|
| JP | 2009-029343 A | 2/2009 |
| JP | 2011-013895 A | 1/2011 |

*Primary Examiner* — Thomas Tarcza
*Assistant Examiner* — Garrett Evans
(74) *Attorney, Agent, or Firm* — Sughrue Mion, PLLC

(57) ABSTRACT

A drive assist system includes: a movable body (20) in which drive assist is performed by an assist device (40, 50, 60) and which includes a movable body holding unit (23); an external holding unit (14) located outside the movable body (20); and a controller (22) configured to determine whether or not an operation position where the assist device (40, 50, 60) operates is related to the operation of the assist device (40, 50, 60), select the external holding unit (14) as a unit in which the operation result of the assist device (40, 50, 60) is to be held when it is determined that the operation position is not related to the operation of the assist device (40, 50, 60), and select the movable body holding unit (23) as the unit in which the operation result of the assist device (40, 50, 60) is to be held when it is determined that the operation position is related to the operation of the assist device (40, 50, 60).

9 Claims, 4 Drawing Sheets

DRIVE ASSIST SYSTEM, DRIVE ASSIST METHOD, AND DRIVE ASSIST DEVICE

BACKGROUND OF THE INVENTION

1. Field of the Invention

The invention relates to a drive assist system that assists in driving a movable body, a drive, assist method for use in the drive assist system, and a drive assist device.

2. Description of Related Art

It is conventional that a vehicle such as an automobile is provided with a variety of assist devices. Those assist devices detect vehicle information, which is the information based on drive operations performed by the driver or a vehicle speed, or travel environment, which is the information based on a vehicle travelling ahead or a road state, and provide the vehicle with drive assist including preventive safety assist on the basis of the detected vehicle information or travel environment. Examples of such assist devices include an antilock brake system (ABS), which prevents tires from locking, a vehicle stability control system (VSC), which prevents the vehicle from skidding, and a collision preventing device. For example, Japanese Patent Application Publication No. 2009-29343 (JP 2009-29343 A) describes an example of a drive assist system including a plurality of such assist devices.

The drive assist system described in JP 2009-29343 A is provided with drive assist devices (preventive safety devices such as ABS and VSC) and a storage unit that stores a travel location, a travel environment, and a vehicle state when the drive assist devices operate. The drive assist system stores the travel location and travel environment together with the vehicle state in the storage unit when the drive assist devices operate or when a sensor value acquired from a wheel speed sensor, a yaw rate sensor, or a brake pressure sensor that operates the drive assist device exceeds a preset threshold. In this system, the travel location includes a sloping road, an unpaved road, a curve, a parking lot, an intersection, and the like, the travel environment includes an absolute time, snowfall information, rainfall information, outside air temperature, and the like, and the vehicle state includes the vehicle speed and the like. With such a drive assist system, when the vehicle is to be driven in the travel location stored in the storage unit, with the travel environment and vehicle state being similar to the stored travel environment and vehicle state, drive assist, such as warning notification to the driver or vehicle deceleration control, is performed.

SUMMARY OF THE INVENTION

A system has recently been investigated in which operation information such as sites where the drive assist devices have been operated is collected in a center managing information relating to drive assist, and the collected operation information is used in a large number of vehicles. With such a system, the operation information should be transmitted from the vehicle to the center. However, the amount of operation information to be transmitted from the vehicle to the center tends to increase with the increase in the number of types of drive assist devices installed on the vehicle. Therefore, the increase in processing load in the vehicle when the operation information is transmitted to the center cannot be ignored.

The invention provides a drive assist system, a drive assist method, and a drive assist device that can reduce the transmission load of information relating to the operation of drive assist devices.

A first aspect of the invention is a drive assist system including: a movable body in which drive assist is performed by an assist device and which includes a movable body holding unit configured to hold an operation result of the assist device; an external holding unit that is provided in an external device located outside the movable body and that is configured to hold the operation result of the assist device; and a controller configured to determine whether or not an operation position where the assist device operates is related to the operation of the assist device, select the external holding unit as a unit in which the operation result of the assist device is to be held when it is determined that the operation position where the assist device operates is not related to the operation of the assist device, and select the movable body holding unit as the unit in which the operation result of the assist device is to be held when it is determined that the operation position where the assist device operates is related to the operation of the assist device.

A second aspect of the invention is a drive assist method for use in a drive assist system including a movable body in which drive assist is performed by an assist device and which includes a movable body holding unit configured to hold an operation result of the assist device, and an external holding unit that is provided in an external device located outside the movable body and that is configured to hold the operation result of the assist device. The drive assist method including: determining whether or not an operation position where the assist device operates is related to the operation of the assist device; selecting the external holding unit as a unit in which the operation result of the assist device is to be held when it is determined that the operation position where the assist device operates is not related to the operation of the assist device; and selecting the movable body holding unit as the unit in which the operation result of the assist device is to be held when it is determined that the operation position where the assist device operates is related to the operation of the assist device.

With such a configuration, the unit (holding destination) in which the operation result of the assist device is to be held is set to the external holding unit when it is determined that the operation position where the assist device operates is not related to the operation of the assist device, and to the movable body holding unit when it is determined that the operation position where the assist device operates is related to the operation of the assist device. Where the holding destination is thus set on the basis of such a determination, the operation result of the assist device can be held in the appropriate holding destination. By setting the appropriate holding destination of the operation result, it is possible to restrict the operation result to be transmitted to the external device only to the necessary operation result, and the operation result useful for the movable body can be held in the movable body. In other words, the transmission load of information relating to the operation of the assist device can be reduced.

Further, where the appropriate unit is used for holding the operation result, the convenience relating to the use of the held operation result can be expected to be increased. In the drive assist system, the controller may be configured to determine whether or not the operation position where the assist device operates is related to the operation of the assist device on the basis of the number of sites of operation positions where the assist device has operated and the number of operations performed by the assist device.

With such a configuration, by determining whether or not the operation position where the assist device operates is related to the operation of the assist device on the basis of the number of sites and the number of operations, it is possible to inhibit the computational processing required for the determination and reduce the processing load.

In the drive assist system, the controller may be configured to determine that the operation position where the assist device operates is related to the operation of the assist device when a ratio of the number of sites to the number of operations is less than a predetermined ratio.

With such a configuration, determination that the operation position where the assist device operates is related to the operation of the assist device can be made when the ratio of the number of sites to the number of operations is less than a predetermined ratio. Thus, since the computational processing required for the determination is inhibited, the processing load can be reduced.

In the drive assist system, the predetermined ratio may be 50%. With such a configuration, determination as to whether or not the operation position where, the assist device operates is related to the operation of the assist device can be made in a simple manner by setting the predetermined ratio to 50%, that is, to a half.

In the drive assist system, the controller may be configured to determine that the operation position where the assist device operates is not related to the operation of the assist device when the assist device is an antilock brake system or a vehicle stability control system.

The drive assist operation performed by an ABS or VSC tends to be site independent. Therefore, the operation results of a large number of vehicles are preferably used as collective intelligence with respect to the operation position of the ABS or VSC. Accordingly, with such a configuration, the information on the operation sites of drive assist that are preferably used as collective intelligence can be held in an external device suitable for accumulating the collective intelligence. In other words, the operation result in the drive assist system can be held in an appropriate unit.

In the drive assist system, the controller may be configured to determine that the operation position where the assist device operates is related to the operation of the assist device when the assist device is a device configured to prevent idle rotation of a wheel of the movable body during acceleration.

The operation of drive assist performed by a traction control system (TRC), which is a device preventing idle rotation of wheels of a movable body during initial movement or acceleration tends to be site dependent. Therefore, the operation result in the movable body can be itself effectively used with respect to the operation position of the TRC. With such a configuration, the information on the operation site of the drive assist that can be used in a single movable body can be held in the movable body. In other words, the operation result of the drive assist system can be held in an appropriate unit.

The number of operations of the TRC tends to be larger than that of the ABS or VSC. Therefore, since the operation results of the TRC are held in the movable body, the increase in the communication load required for transmitting the operation results of drive assist from the mobile body to the external device is inhibited and the increase in the usage amount of the storage area of the external device is also inhibited.

A third aspect of the invention is a drive assist device installed in a movable body, including: a holding unit configured to hold an operation result of an assist device configured to perform drive assist; and a controller configured to determine whether or not an operation position where the assist device operates is related to the operation of the assist device, and hold the operation result of the assist device in the holding unit when it is determined that the operation position where the assist device operates is related to the operation of the assist device. In the drive assist device, the controller may be configured to output the operation result of the assist device to an external device located outside the movable body when it is determined that the operation position where the assist device operates is not related to the operation of the assist device.

With such a configuration, the holding destination of the operation result of the assist device of the mobile body is set to the mobile body when it is determined that the operation position where the assist device operates is related to the operation of the assist device. Where the holding destination of the operation result of the assist device is set on the basis of such a determination, the operation result that is useful only for the movable body is held in the movable body. In other words, by processing in the movable body the information relating to the operation of the assist device, the transmission load to the outside of the mobile body that relates to this information can be reduced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
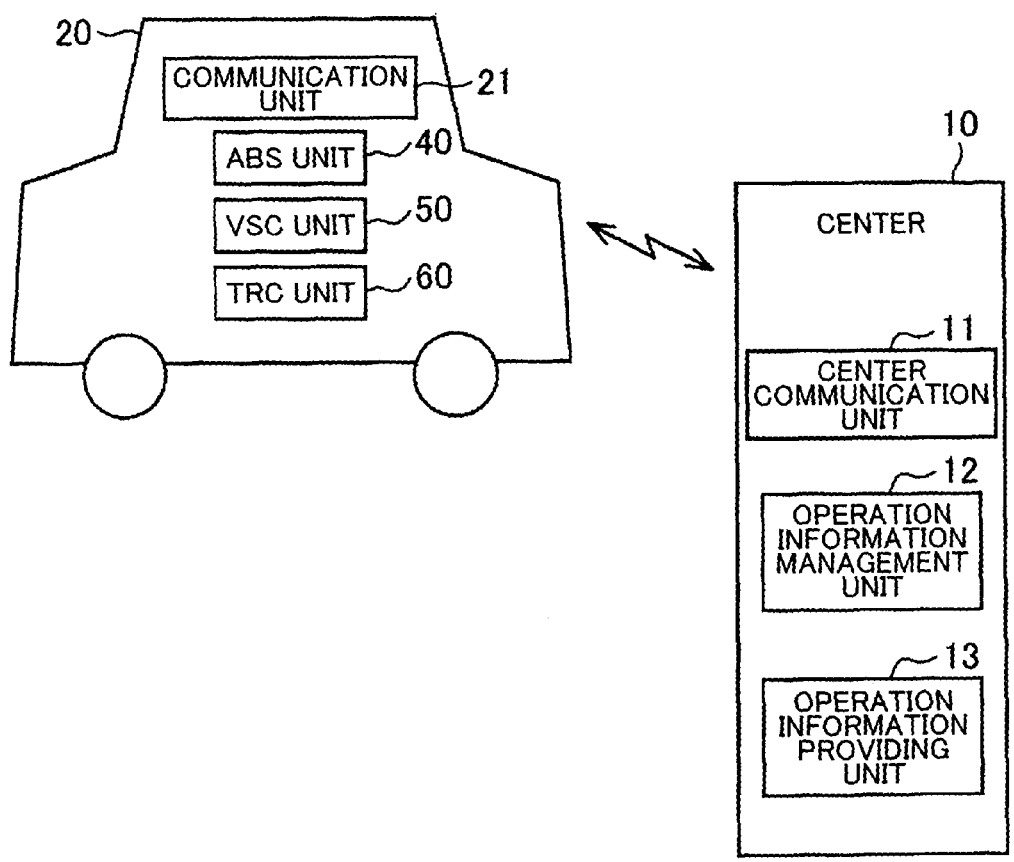
FIG. 1 is a block diagram showing the schematic configuration of a drive assist system in a specific embodiment thereof.

An embodiment of the drive assist system is explained below with reference to FIGS. 1 to 4. First, the schematic configuration of the drive assist system is explained with reference to FIG. 1. As shown in FIG. 1, the drive assist system includes a center 10 as an external device that manages information relating to drive assist, and a vehicle 20 as a movable body providing the information relating to drive assist to the center 10.

The vehicle 20 is a vehicle, such as an automobile, which travels on a road, for example, a passenger car, a bus, and a truck. The vehicle 20 includes an onboard communication unit 21 configured to exchange information of various types, including information relating to drive assist, with an external device such as the center 10 by wire or wireless communication. The vehicle 20 also includes an ABS unit 40 configured to perform drive control of an ABS and a VSC unit 50 configured to perform drive control of a VSC. The ABS is configured to prevent wheels from locking during braking and the VSC is configured to prevent the vehicle from skidding. The vehicle 20 also includes a TRC unit 60 configured to perform drive control of a TRC. The TRC is a device configured to prevent, the vehicle wheels from idle rotation (slip) when the vehicle starts moving or accelerates. The vehicle 20 can transmit an ABS operation result produced on the basis of ABS operation, a VSC operation result produced on the basis of VSC operation, or a TRC operation result produced on the basis of TRC operation to the center 10.

The center 10 includes a center communication unit 11 configured to exchange information of various types, including information relating to drive assist, with an external device such as the vehicle 20 by wire or wireless communication. The center 10 also includes an operation information management unit 12 configured to acquire and manage the ABS operation result, VSC operation result, or TRC operation result from the vehicle 20. The center 10 also includes an operation information providing unit 13 configured to provide the managed ABS operation information, VSC operation information, or TRC operation information to the vehicle 20.

Therefore, the center 10 can acquire the ABS operation result, VSC operation result, or TRC operation result from the vehicle 20 by information communication between the center communication unit 11 and the onboard communication unit 21, and can transmit the managed ABS operation result, VSC operation result, or TRC operation result to the vehicle 20.

Figure 2:
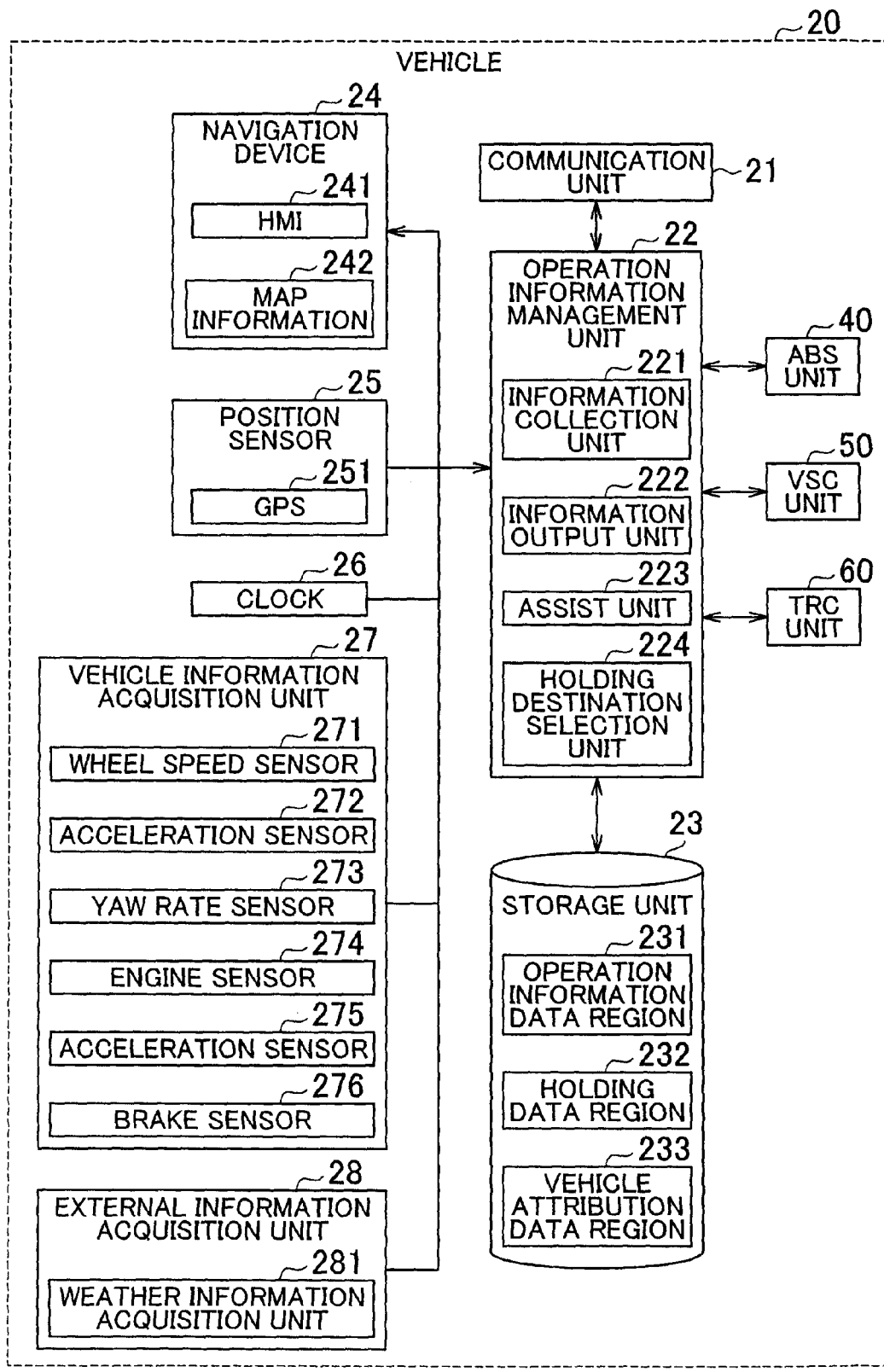
FIG. 2 is a block diagram showing the schematic configuration of a vehicle in which the drive assist system operates in the embodiment.

The configuration of the drive assist system of the embodiment is explained below in greater detail. As shown in FIG. 2, the vehicle 20 includes an operation information management unit 22 configured to manage ABS operation information, VSC operation information, and TRC operation information together with vehicle information and external information, and a storage unit 23 as a holding unit configured to hold various types of information managed in the operation information management unit 22. The operation information management unit 22 is connected to the ABS unit 40, VSC unit 50, TRC unit 60, and onboard communication unit 21 to enable mutual transmission of information. The operation information management unit 22 is also connected to the storage unit 23 to enable reading and writing of various types of information.

The vehicle 20 also includes a navigation device 24 configured to provide the driver with information relating to vehicle navigation, a position sensor 25 configured to detect the current position, a clock 26 configured to indicate the current time, a vehicle information acquisition unit 27 configured to acquire information relating to the vehicle, and an external information acquisition unit 28 configured to acquire information external to the vehicle as external information. The navigation device 24, position sensor 25, clock 26, vehicle information acquisition unit 27, and external information acquisition unit 28 are connected to the operation information management unit 22 to enable the transmission of held information of various types.

The navigation device 24 notifies the driver of the movement path to the travel destination region by referring to the current position of the vehicle detected using a global positioning system (GPS) and map information 242 including road information that has been stored in advance. The navigation device 24 includes a human-machine interface (HMI) 241 constituted by a display device, an input device, and a voice device. The navigation device 24 also can output information relating to drive assist, which has been inputted from the operation information management unit 22, from the HMI 241, thereby notifying the driver of the information.

The display device is constituted by a liquid crystal display or the like and disposed at a position where it can be viewed by the driver. The input device uses a mechanical switch or a touch switch integrated with the display device. The input device can be used for various input operations. The voice device outputs voice or sound corresponding to the inputted data such as voice information or warning sound.

The position sensor 25 includes a GPS 251 to be used for detecting the current position of the vehicle 20. The GPS 25.1 receives a signal from a GPS satellite and detects the current position of the vehicle 20 on the basis of the received signal from the GPS satellite. The position sensor 25 outputs information indicating the detected position to the operation information management unit 22. The position sensor 25 may be shared with the navigation device 24.

The clock 26 outputs information indicating the current time to the operation information management unit 22. The current time may be also obtained from the GPS 251. The vehicle information acquisition unit 27 includes a wheel speed sensor 271, an acceleration sensor 272, a yaw rate sensor 273, an engine sensor 274, an acceleration sensor 275, and a brake sensor 276.

The wheel speed sensor 271 detects the rotation speed of the wheels of the vehicle 20 and outputs a signal corresponding to the detected rotation speed to the operation information management unit 22. For example, when a signal indicating "0" as a rotation speed is outputted from the wheel speed sensor 271, it can be assumed that the vehicle has been stopped.

The acceleration sensor 272 detects the acceleration of the vehicle 20 and outputs a signal corresponding to the detected acceleration to the operation information management unit 22. For example, when a signal indicating about "0" as the acceleration is outputted from the acceleration sensor 272, it can be assumed that the vehicle has been stopped or travels very stably.

The yaw rate sensor 273 detects the variation speed of the rotation angle in the turning direction of the vehicle 20 (yaw rate) and outputs a signal corresponding to the detected yaw rate to the operation information management unit 22. For example, when a signal indicating the variation of rotation angle is outputted from the yaw rate sensor 273, it can be assumed that the vehicle turns or skids.

The engine sensor 274 detects the rotation speed of the engine of the vehicle 20 and outputs a signal corresponding to the detected rotation speed to the operation information management unit 22. For example, when a signal indicating a rotation speed "0" is outputted from the engine sensor 274, it can be assumed that the vehicle has been stopped.

The acceleration sensor 275 detects whether or not an accelerator pedal operation has been performed by the driver and the depression amount of the accelerator pedal, and outputs a signal corresponding to the detected accelerator pedal operation and the depression amount of the accelerator pedal to the operation information management unit 22. For example, when a signal indicating that the accelerator pedal has been depressed is outputted from the acceleration sensor 275, it can be assumed that the vehicle starts moving or is accelerated.

The brake sensor 276 detects whether or not a brake pedal operation has been performed by the driver and the depression amount of the brake pedal, and outputs a signal corresponding to the detected brake pedal operation and the depression amount of the brake pedal to the operation information management unit 22. For example, when a signal indicating that the brake pedal has been depressed is outputted from the brake sensor 276, it can be assumed that the brake operation been performed, that is, that the vehicle has been decelerated.

The external information acquisition until 28 is provided with a weather information acquisition unit 281 that acquires information relating to weather which is one of the external environment factors for the vehicle 20. The weather information acquisition unit 281 is connected to the operation information management unit 22 so as to enable the transmission of held information of various types. When the present weather information is acquired, the weather information acquisition unit 281 detects the operation of wipers and acquires values from a thermometer, a hygrometer, or a manometer. The weather information acquisition unit 281 may acquire those values by communication from a radio or a weather notification system. The weather information acquisition unit 281 outputs a signal corresponding to the acquired weather information to the operation information management unit 22.

Further, the external information acquisition unit 28 may also include a communication device for acquiring road information and traffic information by road-to-vehicle communication from the on-ground equipment provided at the road or the like, or a communication device for acquiring various types of information by vehicle-to-vehicle communication with other vehicles.

The ABS unit 40 constitutes the ABS, which is a system preventing the wheels from locking during braking, and performs drive control of the ABS. The ABS unit 40 has a conventional configuration that provides the drive assist by the ABS to the vehicle on the basis of information from various sensors of the vehicle information acquisition unit 27. The ABS unit 40 can acquire sensor information of various types from the vehicle information acquisition unit 27 in a real-time mode (this feature is not shown in the figures). Further, in the embodiment, the ABS unit 40 is connected to the operation information management unit 22 so as to be capable of transmitting information thereto, and outputs operation information on the ABS function to the operation information management unit 22. The operation information on the ABS function includes information on whether or not the ABS has been operated and on the brake force for each wheel during the ABS operation.

The VSC unit 50 constitutes the VSC, which is a system preventing the vehicle from skidding, and performs drive control of the VSC. The VSC unit 50 has a conventional configuration that provides the drive assist by the VSC to the vehicle on the basis of information from various sensors of the vehicle information acquisition unit 27. The VSC unit 50 can acquire sensor information of various types from the vehicle information acquisition unit 27 in a real-time mode (this feature is not shown in the figures). Further, in the embodiment, the VSC unit 50 is connected to the operation information management unit 22 so as to be capable of transmitting information thereto, and outputs operation information on the VSC function to the operation information management unit 22. The operation information on the VSC function includes information on whether or not the VSC has been operated and on the engine output or the brake force for each wheel during the VSC operation.

The TRC unit 60 constitutes the TRC, which is a system preventing the vehicle wheels from idle rotation (slip) when the vehicle starts to move or accelerates, and performs drive control of the TRC. The TRC unit 60 has a conventional configuration that provides the drive assist by the TRC to the vehicle on the basis of information from various sensors of the vehicle information acquisition unit 27. The TRC unit 60 can acquire sensor information of various types from the vehicle information acquisition unit 27 in a real-time mode (this feature is not shown in the figures). Further, in the embodiment, the TRC unit 60 is connected to the operation information management unit 22 so as to be capable of transmitting information thereto, and outputs operation information on the TRC function to the operation information management unit 22. The operation information on the TRC function includes information on whether or not the TRC has been operated and on the brake force acting upon the drive wheels and the engine output during the TRC operation.

The operation information management unit 22 includes an information collection unit 221 configured to generate the ABS operation result, VSC operation result, or TRC operation result and store the produced result in the storage unit 23, and an information output unit 222 configured to output the ABS operation result, VSC operation result, or TRC operation result to the center 10 or the host vehicle 20. Further, the operation information management unit 22 also includes an assist unit 223 configured to receive the ABS operation result, VSC operation result, or TRC operation result as assist information and perform the drive assist on the basis of the received assist information, and a holding destination selection unit 224 configured to set a unit (holding destination) in which the operation result outputted from the information output unit 222 is to be held.

The storage unit 23 is constituted by some or all of the storage regions provided in conventional storage devices. In these regions, an operation information data region 231, a holding data region 232, and a vehicle attribution data region 233 are included. The ABS operation result, VSC operation result, or TRC operation result that is written by the information collection unit 221 is stored in the operation information data region 231, and the ABS operation result, VSC operation result, or TRC operation result stored in the operation information data region 231 is read by the information output unit 222.

The operation information data region 231 is a storage region for storing the ABS operation result, VSC operation result, or TRC operation result. The operation information data region 231 may be configured of the so-called database capable of adding, reading, and deleting the operation results of the systems.

The holding data region 232 is a storage region for holding the TRC operation result or the like in the vehicle 20. The holding data region 232 may be configured of the so-called database capable of adding, reading, and deleting the operation results.

The vehicle attribution data region 233 stores information for specifying the host vehicle 20, or information indicating the vehicle type, vehicle specifications, and types of the assist devices (for example, the ABS, VSC, and TRC) installed thereon. In other words, the vehicle attribution data region 233 stores information indicating that the ABS, VSC, and TRC have been installed on the vehicle 20.

The information collection unit 221 generates as the ABS operation result the information in which vehicle information of various types and external information of various types are associated with the ABS operation information. The ABS operation information is the information that is obtained from the ABS unit 40 and indicates that the ABS has been operated. The information collection unit 221 writes, that is, stores by addition, the generated ABS operation result to the operation information data region 231. The information collection unit 221 generates as the VSC operation result the information in which vehicle information of various types and external information of various types are associated with the VSC operation information. The VSC operation information is the information that is obtained from the VSC unit 50 and indicates that the VSC has been operated. The information collection unit 221 writes, that is, stores by addition, the generated VSC operation result to the operation information data region 231. The information collection unit 221 generates as the TRC operation result the information in which vehicle information of various types and external information of various types are associated with the TRC operation information. The TRC operation information is the information that is obtained from the TRC unit 60 and indicates that the TRC has been operated. The information collection unit 221 writes, that is, stores by addition, the generated TRC operation result to the operation information data region 231.

The ABS operation result, VSC operation result, or TRC operation result includes, for example, position information, operation information, and information on time, speed, and weather. The ABS operation result, VSC operation result, or TRC operation result can include necessary information from among the map information or road information acquired from the vehicle attribution data region 233 of the storage unit 23 or the navigation device 24, and the position acquired from the position sensor 25 and the time acquired from the clock 26. The ABS operation result, VSC operation result, or TRC operation result can include necessary information from among the detection values of various sensors acquired by the vehicle information acquisition unit 27 as vehicle information, and weather information or traffic information acquired from the external information acquisition unit 28 as external information.

The ABS operation result, VSC operation result, or TRC operation result that has thus been created is information collected on the basis of actual travel of the vehicle 20. Information that cannot be stored in advance in the navigation device or the like is included in the collected operation results. In other words, such operation results include information that can be acquired only from actually traveling vehicle.

The information output unit 222 reads, at a predetermined timing, the ABS operation result, VSC operation result, or TRC operation result that has been stored in the operation information data region 231 of the storage unit 23, and outputs the result, which has been read out, to the center 10 or holds the result in the holding data region 232. The information output unit 222 sets the read timing of the operation results for a predetermined time or when the vehicle 20 is stopped. In the embodiment, the information output unit 222 sets either the center 10 or the host vehicle 20 selected by the holding destination selection unit 224 as the holding destination for the operation result that has been read out.

In other words, when the holding destination selected by the holding destination selection unit 224 is the center 10, the information output unit 222 outputs the operation result, which has been read out, to the center 10 via the onboard communication unit 21. When the holding destination selected by the holding destination selection unit 224 is the host vehicle 20, the information output unit 222 stores by addition the operation result, which has been read out, in the holding data region 232. When the operation result, which has been read out, is held in the center 10 or the holding data region 232 of the host vehicle 20, the information output unit 222 may delete the ABS operation result, VSC operation result, or TRC operation result, which has been read out, from the operation information data region 231 of the storage unit 23.

The holding destination selection unit 224 select one of the center 10 and the host vehicle 20 as a holding destination in which the operation result that has been read by the information output unit 222 is to be held. When the center 10 is selected as the holding destination, the operation result is held in the storage unit 14 (see FIG. 3) of the center 10, and when the host vehicle 20 is selected as the holding destination, the operation result is held in the storage unit 23 of the host vehicle 20.

The holding destination selection unit 224 selects one of the center 10 and the host vehicle 20 as the holding destination on the basis of determination as to whether or not the operation position of an assist device is related to the Operation of the assist device. In other words, where it is determined that the operation position of a drive assist device is not related to the operation of the drive assist device, the holding destination selection unit 224 selects the center 10 as the holding destination for the operation result of this assist device, and where it is determined that the operation position of a drive assist device is related to the operation of the drive assist device, the holding destination selection unit selects the host vehicle 20 as the holding destination for the operation result of this assist device.

In the embodiment, it is set in the holding destination selection unit 224 that, when the assist device is the TRC, the operation position of a drive assist device is related to the operation of the drive assist device and that, when the assist device is the ABS or VSC, the operation position of a drive assist device is not related to the operation of the drive assist device. Therefore, when the assist device is the ABS, the holding destination selection unit 224 determines that the ABS operation position is not related to the ABS operation. Further, when the assist device is the VSC, it is determined that the VSC operation position is not related to the VSC operation. Meanwhile, when the assist device is the TRC, it is determined that the TRC operation position is related to the TRC operation. As a result, the holding destination selection unit 224 selects the center 10 as the holding destination for the ABS operation result and VSC operation result, and selects the host vehicle 20 as the holding destination for the TRC operation result.

The reason why the holding destination selection unit 224 thus determines the holding destination is explained below. In general, the ABS operation position (site) in the vehicle 20 tends to be different for each operation. In other words, the correlation between the operation site where the ABS operates and the ABS operation is low, that is, the operation site where the ABS operates tends to be not related to the ABS operation. Further, the VSC operation position (site) in the vehicle 20 tends to be different for each operation. In other words, the correlation between the operation site where the VSC operates and the VSC operation is low, that is, the operation site where the VSC operates tends to be not related to the VSC operation. Meanwhile, the TRC in the vehicle 20 tends to operate at the same operation position (site). In other words, the correlation between the operation site where the TRC operates and the TRC operation is high, that is, the operation site where the TRC operates tends to be related to the TRC operation.

For this reason, in the vehicle 20, it is difficult to estimate the operation position for an ABS operation or a VSC operation, which is not related to the operation site, only from the operation result in the host vehicle 20. Accordingly, when an ABS operation position or a VSC operation position is to be estimated, it is preferred that collective intelligence be used that is based on operation results obtained in a large number of vehicles that have been collected in the center 10. As a result, the ABS operation position or VSC operation position that cannot be estimated only from the information on the host vehicle 20 is estimated on the basis of the collective intelligence of a larger number of vehicles.

Meanwhile, with respect to a TRC operation, which is related to the operation site, the operation position thereof can be estimated in the vehicle 20 on the basis of the past operation results held in the host vehicle 20. In other words, the TRC operation position can be estimated using the past operation results held in the vehicle 20. Further, when the relationship with the operation site is strong, the operation results of other vehicle can be, conversely, unsuitable.

For such a reason, the holding destination selection unit 224 determines that the operation position is not related to the operation for the ABS operation result and VSC operation result, and determines that the operation position is related to the operation for the TRC operation result.

In other words, when the operation results collected from the operation information data region 231 on the basis of fulfillment of the collection conditions are the ABS operation result and VSC operation result, the information output unit 222 sends the collected ABS operation result and VSC operation result to the center 10. Once the outputted ABS operation result or VSC operation result has been held in the center 10, the information output unit 222 deletes the outputted ABS operation result or VSC operation result from the operation information data region 231. Meanwhile, when the operation result collected from the operation information data region 231 on the basis of fulfillment of the collection conditions is the TRC operation result, the information output unit 222 causes the collected TRC operation result to be held in the holding data region 232 of the storage unit 23 of the vehicle 20. Once the TRC operation result has been held in the holding data region 232 of the storage unit 23, the information output unit 222 deletes the held TRC operation result from the operation information data region 231.

The assist unit 223 performs drive assist, such as notification of the driver, on the basis of the ABS operation result, VSC operation result, or TRC operation result acquired as assist information. In the embodiment, the assist unit 223 acquires the ABS operation result and VSC operation result from the center 10 and acquires the TRC operation result from the storage unit 23 of the host vehicle 20.

When the ABS operation result and VSC operation result are acquired, the assist unit 223 outputs an assist information request signal to the center 10. The assist information request signal is a signal including information for specifying the host vehicle, current position information, and information indicating the vehicle attribution. The assist unit 223 receives the ABS operation result or VSC operation result, which has been returned from the center 10 to the host vehicle address, as assist information. When the host vehicle approaches the operation position included in the acquired assist information (ABS operation result or VSC operation result), the assist unit 223 notifies the driver, via the HMI 241 or the navigation device 24, that the assist device (ABS or VSC) of another vehicle has operated in the past at this operation position.

Further, when the TRC operation result is acquired, the assist unit 223 searches for the TRC operation result held in the holding data region 232 on the basis of the current position of the vehicle 20 and acquires the TRC operation result at the current position or in the vicinity thereof. The assist unit 223 then notifies the driver, via the HMI 241 or the navigation device 24, that the assist device (TRC) of the host vehicle 20 has operated in the past at the operation position included in the acquired assist information (TRC operation result).

The assist unit 223 also determines whether or not the vehicle information or external information included in the ABS operation result, VSC operation result, or TRC operation result is similar to the current vehicle information on the vehicle 20 or current external information, and when the information is similar, the assist unit may perform drive assist on the basis of the operation result. When the ABS operation result, ABS operation result similar to VSC operation result, or VSC operation result acquired from the center 10 is held in the operation information data region 231, the assist unit 223 may also perform drive assist on the basis of the operation result. The ABS operation result or VSC operation result acquired from the center 10 and the TRC operation result held in the host vehicle 20 can thus be adequately filtered, and drive assist that is unsuitable and can be troublesome to the driver at the current point of time is prevented from being performed in the vehicle.

Figure 3:
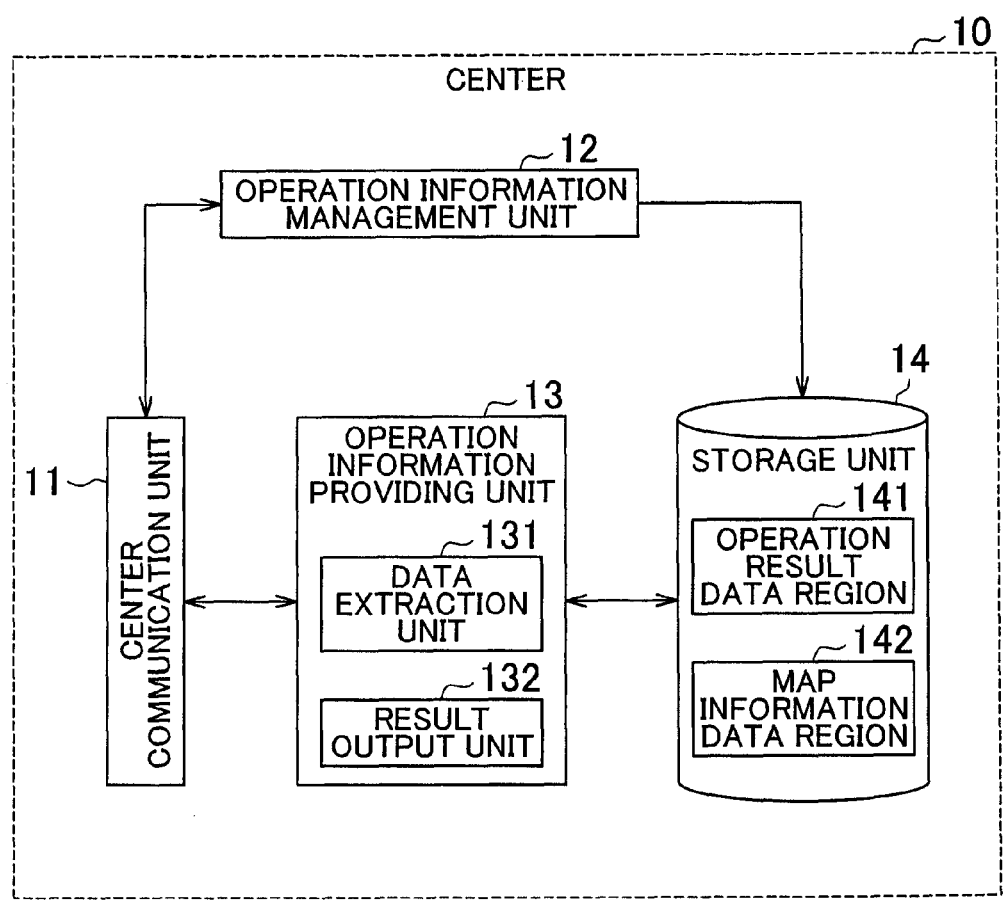
FIG. 3 is a block-diagram schematically illustrating the simplified configuration of a center in the embodiment.

As shown in FIG. 3, in the center 10, the center communication unit 11 is connected to the operation information management unit 12 and the operation information providing unit 13 so that information can be transmitted thereto. The center 10 includes a storage unit 14 serving as a holding unit configured to hold various types of information such as an ABS operation result or a VSC operation result. The operation information management unit 12 and the operation information providing unit 13 are connected to the storage unit 14 so as to be capable of reading and writing the information.

The storage unit 14 is constituted by some or all of the storage regions that have been provided in conventional storage devices, and an operation result data region 141 and a map information data region 142 are included in the storage regions. The ABS operation result or VSC operation result acquired from the vehicle 20 is stored in the operation result data region 141. The operation result data region 141 may be configured of the so-called database capable of adding, reading, and deleting the operation results of the systems.

Map information including road information is stored in the map information data region 142. The ABS operation result or VSC operation result provided from the vehicle 20 via the center communication unit 11 is inputted to the operation information management unit 12. The operation information management unit 12 stores, by addition, the inputted ABS operation result or VSC operation result in the operation result data region 141. The operation information management unit 12 may delete an operation result that has become unnecessary, such as an old operation result, from the operation result data region 141.

The operation information providing unit 13 receives an assist information request signal from the vehicle 20. The operation information providing unit 13 also selects and acquires the ABS operation result or VSC operation result from the storage unit 14 on the basis of position information included in the received assist information request signal, and outputs the acquired operation result to the vehicle that has outputted the assist information request signal.

The operation information providing unit 13 includes a data extraction unit 131 configured to extract operation results on the basis of position information and a result output unit 132 configured to output the acquired operation result. On the basis of position information included in the received assist information request signal, the data extraction unit 131 selects and acquires from the operation result data region 141 the ABS operation result or VSC operation result associated with the position information or the vicinity thereof.

The operation result output unit 132 outputs the operation results acquired by the data extraction unit 131 as assist information from the center 10 to the vehicle 20 that has outputted the assist information request signal via the center communication unit 11.

Figure 4:
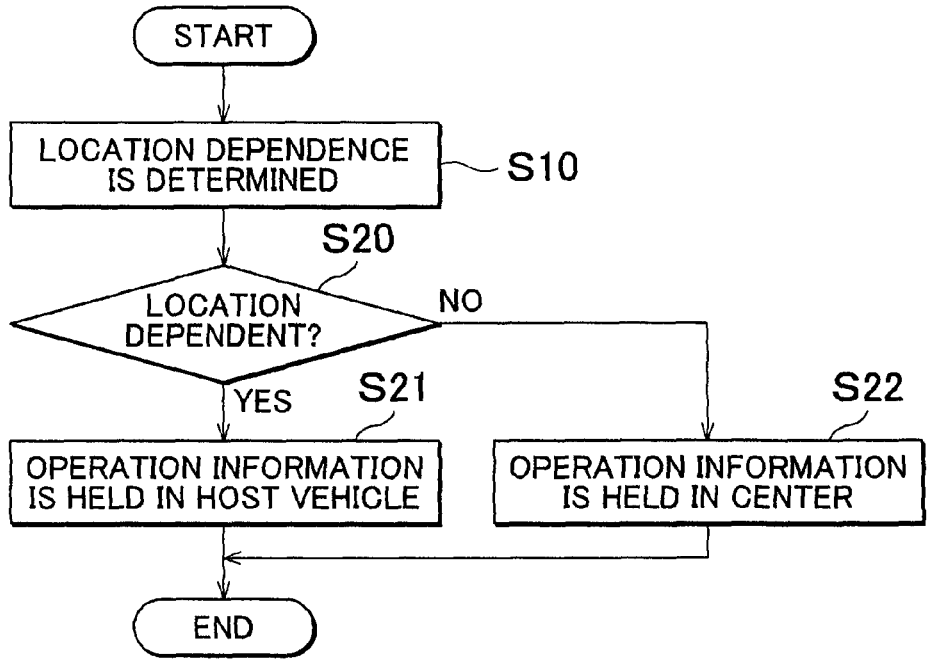
FIG. 4 is a flowchart illustrating an example of a procedure for setting the holding destination for the operation result of an assist device in the vehicle in which the drive assist device operates in the embodiment.

As a result, the assist information held in the center 10 is transmitted to the vehicle 20, and drive assist based on the transmitted assist information is performed in the vehicle 20. The operation of the above-described configuration is explained below.

Where a read condition for operation results is fulfilled, the vehicle 20 performs holding processing of holding the operation results in the holding destination that has been set by the holding destination selection unit 224. In the vehicle 20, the read condition for operation results is fulfilled in a timely manner.

Where the read condition is fulfilled, as shown in FIG. 4, the vehicle 20 reads each operation result from the operation information data region 231 of the storage unit 23 and determines whether or not the operation position of the assist device in the operation result that has been read out is related to the operation of the assist device in the operation result that has been read out, that is, determines, whether or not the assist information is location dependent (step S10 in FIG. 4). In the embodiment, it is assumed that assist information is location dependent when the operation position of an assist device is related to the operation of the assist device, and that assist information is not location dependent (that is, assist information is location independent) when the operation position of an assist device is related to the operation of the assist device. In other words, the holding destination selection unit 224 determines whether or not assist information is location dependent.

Where the determination of location dependence is completed (step S10 in FIG. 4), it is determined whether or not it has been determined that the assist information is location dependent (step S20 in FIG. 4). When it has been determined that the assist information is location dependent, that is, when it has been determined that the operation position of an assist device is related to the operation of the assist device (YES in step S20 in FIG. 4), the vehicle 20 causes the holding data region 232 of the storage unit 23 of the host vehicle 20 to hold the operation result that has been read (step S21 in FIG. 4) and ends the processing of holding the operation results in the holding destination. In the embodiment the TRC operation result is thus held in the storage unit 23 of the vehicle 20.

Meanwhile, where it is determined that the assist information is location independent, that is, where it is determined that there is no relationship between the operation position of the assist device and the operation of the assist device (NO in step S20 in FIG. 4), the vehicle. 20 causes the operation result data region 141 of the storage unit 14 of the center 10 to hold the operation result that has been read out (step S22 in FIG. 4) and ends the processing of holding the operation results in the holding destination. In the embodiment the ABS operation result or VSC operation result is thus held in the storage unit 14 of the center 10.

In other words, in the case of the ABS and VSC, it is determined that the location where the assist device has operated is not related to the operation of the assist device, and the ABS or VSC operation result is held in the center 10. Meanwhile, in the case of the TRC, it is determined that the location where the assist device has operated is related to the operation of the assist device, and the TRC operation result is held in the vehicle 20. As a result, in the vehicle 20, the processing load for outputting the TRC operation result to the center 10 is reduced and the communication load is also reduced. In other words, the transmission load of information relating to the operation of assist devices in the vehicle 20 can be reduced. Further, the responsiveness to drive assist in the vehicle 20 can be increased by using the TRC operation result held in the vehicle 20. In addition, the number of operations performed by the TRC is usually greater than those performed by the ABS or VSC. By holding the operation result of the TRC, which has a large number of operations, in the vehicle 20, the effect of reducing the processing load for outputting information to the center 10 and the effect of reducing the communication load can be further enhanced.

Further, since the TRC operation results from the vehicle 20 are not collected in the center 10, the processing load relating to the collection of operation results in the center is reduced and the communication load is also reduced. In other words, the transmission load of information relating to the operation of assist devices can be reduced in the center 10. Furthermore, the usage amount of the storage region of the storage unit 14 of the center 10 can be also reduced. In particular, a high effect is achieved in preventing the increase in the usage amount of the storage unit 14 because the operation result of the TRC, which has a large number of operations, is not held in the storage region of the storage unit 14.

As described hereinabove, with the drive assist system and drive assist method according to the embodiment, the below-described effects are obtained. The holding destination of the operation result of the assist device of the vehicle 20 is set to the center 10 when it is determined that the operation position where the assist device operates is not related to the operation of the assist device, and set to the host vehicle 20 when it is determined that the operation position where the assist device operates is related to the operation of the assist device. Where the holding destination of the operation result of the assist device is thus set on the basis of the aforementioned determination, the operation result of the assist device can be held in the adequate holding destination. By setting the adequate holding destination for the operation result, it is possible to transmit only the necessary operation results (ABS operation result and VSC operation result) to the center 10 and hold in the host vehicle 20 the operation result that is also useful for the host vehicle 20. In other words, the transmission load, such as the processing load and communication load, necessary for transmitting the information relating to the assist device operation can be reduced both in the vehicle 20 and in the center 10.

Further, where the device for which the operation result is to be held is adequate, the convenience relating to the usage of the operation result that has been held can be also expected to be increased. In the drive assist performed by the ABS or VSC, the operation thereof tends to be site independent. Therefore, it is preferred that the operation results of a large number of movable bodies be used as collective intelligence with respect to the operation position of the ABS or VSC. Accordingly, the information on the operation site of drive assist for which the usage as collective intelligence is preferred is held in the center 10 suitable for accumulating the collective intelligence. In other words, the operation result in the drive assist system can be held in the adequate device.

In the drive assist performed by the TRC, the operation thereof tends to be site dependent. Therefore, the operation result in the host vehicle 20 can be effectively used by itself with respect to the TRC operation position. Accordingly, the information on the operation site of drive assist which is useful for the host vehicle 20 is held in the host vehicle 20. In other words, the operation result in the drive assist system can be held in the adequate device.

Further, the number of operations performed by the TRC tends to be greater than that performed by the ABS or VSC. Therefore, as a result of holding the TRC operation result in the vehicle 20, the increase in the communication load necessary for transmitting the operation results of drive assist from the vehicle 20 to the center 10 is inhibited and the increase in the usage amount of the storage region of the center 10 is also inhibited.

The above-described embodiment can be implemented in the following modes. In the above-described embodiment, the case is exemplified in which the position is acquired by the position sensor 25. However, such a configuration is not limiting. For example, the position may be acquired by a GPS installed at a portable information processing device. As a result, the flexibility in designing the drive assist system is increased.

In the above-described embodiment, the case is exemplified in which the vehicle information acquisition unit 27 is provided with the wheel speed sensor 271, acceleration sensor 272, yaw sensor 273, engine sensor 274, acceleration sensor 275, and brake sensor 276. However, such a configuration is not limiting, and the vehicle information acquisition unit may be provided with at least one of the wheel speed sensor, acceleration sensor, yaw rate sensor, engine sensor, acceleration sensor, and brake sensor. As a result, the flexibility in designing the drive assist system is increased.

In the above-described embodiment, the case is exemplified in which the vehicle is provided with the navigation device 24, position sensor 25, clock 26, and external information acquisition unit 28. However, such a configuration is not limiting, and the vehicle may be provided with at least one of the navigation device, position sensor, clock, and external information acquisition unit, provided that the drive assist system functions. As a result, the flexibility in designing the drive assist system is increased.

In the above-described embodiment, the case is exemplified, in which drive assist to the driver is performed via the HMI 241. However, such a configuration is not limiting, and intervention control of the ABS unit, VSC unit, TRC unit, and other drive systems and also the engine system is performed as the drive assist. Examples of such intervention control include fuel cut-off and assist brake. As a result, the flexibility in designing the drive assist system is increased.

In the above-described embodiment, the case is exemplified in which only the TRC operation result is held in the holding data region 232 of the storage unit 23 of the vehicle 20. However, such a configuration is not limiting, and the ABS operation result or VSC operation result may be also held in the holding data region 232. In such a case, the ABS operation result or VSC operation result held in the holding data region 232 can be used as the assist information. As a result, the flexibility in designing the drive assist system is increased.

In the above-described embodiment, the case is exemplified in which the information output unit 222 of the vehicle 20 holds the operation results collected from the operation information data region 231 in the holding data region 232. However, such a configuration is not limiting, and the information output unit may distinguish between the unselected TRC operation result and the TRC operation result for which the holding destination has been selected by assigning the TRC operation result with a flag that can identify the completion of holding destination selection, while the operation result is maintained in the operation information data region 231. For example, in such a case, the configuration in which the storage unit 23 is provided with the operation information data region 231 and the holding data region 232, as in the above-described embodiment, is not limiting, and only the operation information data region 231 may be provided in the storage unit. As a result, the flexibility in designing the drive assist system is increased.

In the above-described embodiment, the case is exemplified in which the ABS operation result and VSC operation result are held in the storage unit 14 of the center 10. However, such a configuration is not limiting, and the TRC operation result may be also held in the storage unit of the center. In such a case, the vehicle can also use the TRC operation result held in the storage unit of the center as the assist information. As a result, the flexibility in designing the drive assist system is increased.

In the above-described embodiment, the case is exemplified in which the operation information management unit 22 is installed on the vehicle 20. However, such a configuration is not limiting, and in the drive assist system, part of the operation information management system, the entire external information acquisition unit or part thereof, the storage unit, and the position sensor may be provided outside the vehicle. For example, an external device such as a portable information processing device may be provided with a function replacing part of the operation information management unit, provided with some or all functions of the external information acquisition unit, provided with a storage unit, or provided with a position sensor. Further, the portable information processing device may perform the drive assist, and a vehicle acquiring necessary information from the portable information processing device may perform the drive assist. As a result, the flexibility in configuring the drive assist system increases.

In the above-described embodiment, the case is exemplified in which the ABS operation result or VSC operation result are determined to have no relationship between the operation position of the assist device and the operation of the assist device. However, such a configuration is not limiting, and the ABS operation result or VSC operation result may be determined to have a relationship between the operation position of the assist device and the operation of the assist device, as a result of changing the determination condition or the like. As a result, the flexibility in configuring the drive assist system increases.

In the above-described embodiment, the case is exemplified in which each of ABS operation result and VSC operation result are set such that the operation position is not related to corresponding one of the ABS operation and the VSC operation, and the TRC operation result is set such that the operation position has a relationship with the TRC operation. However, such a configuration is not limiting, and it may be determined whether or not the operation position of an assist device is related to the operation of the assist device, in other words, whether or not the assist device tends to operate in the same location, from a calculation result based on data processing of the operation results obtained from the assist devices.

For example, the number of sites in which the assist device has operated and the number of operations performed by the assist device may be counted for each assist device, and determination as to whether or not the operation position of the assist device is related to the operation of the assist device may be made on the basis of the ratio of the number of sites to the number of operations. When the ratio of the number of sites to the number of operations is equal to or greater than a predetermined ratio (for example 50%), it may be determined that the operation of the assist device depends on a position. Conversely, when the ratio of the number of sites to the number of operations is less than a predetermined ratio (for example 50%), the operation of the drive device may be determined to have no relationship with the operation position. As a result, the TRC operation result can be set to be held in the center, and, conversely, the ABS operation result or VSC operation result can be held in the vehicle.

Where the determination as to whether or not the operation position where the assist device operates is related to the operation of the assist device is made on the basis of the number of sites and the number of operations, the calculation processing required for the determination can be inhibited and the processing load is reduced. In the case in which determination as to whether or not the operation position where the assist device operates is related to the operation of the assist device is made on the basis of whether or not the ratio of the number of sites to the number of operations is less than a predetermined ratio, the calculation processing required for the determination is also inhibited and, therefore, the processing load is reduced. By setting the predetermined ratio of 50%, that is, to a half, it is possible to determine whether or not the operation position where the assist device operates is related to the operation of the assist device in a simple manner. Therefore, the determination with a low processing load can be provided.

An embodiment of such a configuration is explained below by way of example with reference to FIG. 5. In the embodiment, the processing of step S10 shown in FIG. 4 is changed to the processing shown in FIG. 5. In other words, the holding destination selection unit 224 determines whether or not the operation result is the TRC operation result (step S11 in FIG. 5), and where it is determined that the operation result is the TRC operation result (YES in step S11 in FIG. 5), it may be determined that the TRC operation position is related to the TRC operation (step S12 in FIG. 5). Meanwhile, when it is determined that the operation result is not the TRC operation result (NO in step S11 in FIG. 5), the holding destination selection unit 224 may determine, as described hereinabove, whether or not the assist device tends to operate in the same location (step S13 in FIG. 5). When it is determined that the assist device tends to operate in the same location (YES in step S13 in FIG. 5), the holding destination selection unit 224 may determine that the assist information is location dependent, that is, he operation position of the assist device is related to the operation of the assist device (step S12 in FIG. 5).

Figure 5:
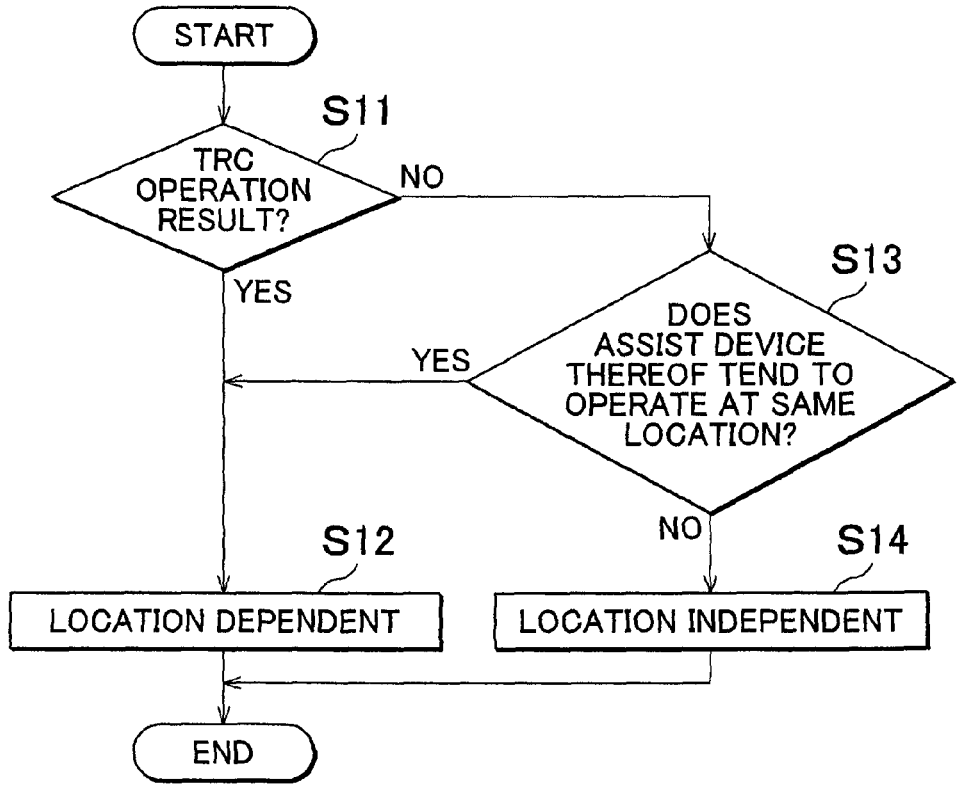
FIG. 5 is a flowchart illustrating a processing example of a procedure for setting the holding destination for the operation result of an assist device in a vehicle in which the drive assist device operates in another specific embodiment.

Meanwhile, where it is determined that the assist device does not tend to operate in the same location (NO in step S13 in FIG. 5), the holding destination selection unit 224 may determine that the assist device is location independent, more specifically, may determine that the operation position of the assist device is related to the operation of the assist device (step S14 in FIG. 5).

In the flowchart shown in FIG. 5, the determination of step S11 may be omitted and the processing may be started from the determination of step S13. As a result, the number of types of the drive assist devices that can use the drive assist system is increased, and the applicability of the drive assist system is expanded.

The aforementioned predetermined ratio is not limited to 50% and may be a value greater than 50%, or a value less than 50%, provided that the holding destination of the operation results of assist devices can be adequately set.

In the above-described embodiment, the case is exemplified in which a condition for determining whether or not the operation position of an assist device is related to the operation of the assist device is set in the vehicle 20. However, such a configuration is not limiting, and a condition for determining whether or not the operation position of an assist device is related to the operation of the assist device may be set in the center, or the result calculated in the center or the like may be transmitted to the vehicle and set therein. As a result, the flexibility in setting the conditions is increased and the convenience of the drive assist system is increased.

In the above-described embodiment, the case is exemplified in which three assist devices, namely, the ABS, VSC, and TRC, are installed on the vehicle 20, but such a configuration is not limiting, and at least one of the ABS, VSC, and TRC may be installed on the vehicle, or other assist devices different from the three assist devices presented by way of example may be installed. Examples of other assist devices include a brake assist device, a lane keeping assist device, and a collision preventing device. As a result, the number of types of the drive assist devices that can use the drive assist system is increased, and the applicability of the drive assist system is expanded.

In the above-described embodiment, the case is exemplified in which only one vehicle 20 is included in the drive system, but such a configuration is not limiting, and a plurality of vehicles may be included in the drive system. As a result, the applicability range of the drive assist system is expanded.

In the above-described embodiment, the case is exemplified in which the drive assist system performs drive assist in the vehicle 20. However, such a configuration is not limiting, and the drive assist system may perform the drive assist in a movable body other than a vehicle, for example, in a train, a ship, or a robot. As a result, the applicability range of the drive assist system is expanded.

The invention claimed is:

1. A drive assist system comprising:
a movable body in which drive assist is performed by an assist device and which includes a movable body holding unit configured to hold an operation result of the assist device;
an external holding unit that is provided in an external device located outside the movable body and that is configured to hold the operation result of the assist device; and
a controller configured to determine whether or not an operation position where the assist device operates is related to the operation of the assist device, select the external holding unit as a unit in which the operation result of the assist device is to be held when it is determined that the operation position where the assist device operates is not related to the operation of the assist device, and select the movable body holding unit as the unit in which the operation result of the assist device is to be held when it is determined that the operation position where the assist device operates is related to the operation of the assist device.

2. The drive assist system according to claim 1, wherein the controller is configured to determine that the operation position where the assist device operates is not related to the operation of the assist device when the assist device is an antilock brake system or a vehicle stability control system.

3. The drive assist system according to claim 1, wherein the controller is configured to determine that the operation position where the assist device operates is related to the operation of the assist device when the assist device is a device configured to prevent idle rotation of a wheel of the movable body during acceleration.

4. The drive assist system according to claim 1, wherein the controller is configured to determine whether or not the operation position where the assist device operates is related to the operation of the assist device on the basis of the number of sites of operation positions where the assist device has operated and the number of operations performed by the assist device.

5. The drive assist system according to claim 4, wherein the controller is configured to determine that the operation position where the assist device operates is related to the operation of the assist device when a ratio of the number of sites to the number of operations is less than a predetermined ratio.

6. The drive assist system according to claim 5, wherein the predetermined ratio is 50%.

7. A drive assist method for use in a drive assist system including a movable body in which drive assist is performed by an assist device and which includes a movable body holding unit configured to hold an operation result of the assist device, and an external holding unit that is provided in an external device located outside the movable body and that is configured to hold the operation result of the assist device, the drive assist method comprising:

determining whether or not an operation position where the assist device operates is related to the operation of the assist device;

selecting the external holding unit as a unit in which the operation result of the assist device is to be held when it is determined that the operation position where the assist device operates is not related to the operation of the assist device; and selecting the movable body holding unit as the unit in which the operation result of the assist device is to be held when it is determined that the operation position where the assist device operates is related to the operation of the assist device.

8. A drive assist device installed in a movable body, comprising:

a holding unit configured to hold an operation result of an assist device configured to perform drive assist; and a controller configured to determine whether or not an operation position where the assist device operates is related to the operation of the assist device, and hold the operation result of the assist device in the holding unit when it is determined that the operation position where the assist device operates is related to the operation of the assist device.

9. The drive assist device according to claim 8, wherein the controller is configured to output the operation result of the assist device to an external device located outside the movable body when it is determined that the operation position where the assist device operates is not related to the operation of the assist device.

* * * * *